United States Patent
Fletcher et al.

(10) Patent No.: US 11,641,283 B2
(45) Date of Patent: May 2, 2023

(54) COMPUTER IMPLEMENTED METHOD AND SYSTEM FOR TRANSFERRING ACCESS TO A DIGITAL ASSET

(71) Applicant: nChain Licensing AG, Zug (CH)

(72) Inventors: John Fletcher, Cambridge (GB); Thomas Trevethan, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/045,425

(22) PCT Filed: Mar. 26, 2019

(86) PCT No.: PCT/IB2019/052428
§ 371 (c)(1),
(2) Date: Oct. 5, 2020

(87) PCT Pub. No.: WO2019/193452
PCT Pub. Date: Oct. 10, 2019

(65) Prior Publication Data
US 2021/0152371 A1    May 20, 2021

(30) Foreign Application Priority Data
Apr. 5, 2018  (GB) .................................... 1805633

(51) Int. Cl.
*H04L 9/32* (2006.01)
*H04L 9/08* (2006.01)
(Continued)

(52) U.S. Cl.
CPC ............ *H04L 9/3255* (2013.01); *H04L 9/085* (2013.01); *H04L 9/3066* (2013.01);
(Continued)

(58) Field of Classification Search
USPC ................ 713/176, 150, 163; 726/2, 21, 36; 380/255, 264, 276
See application file for complete search history.

(56) References Cited

U.S. PATENT DOCUMENTS 10,938,549 B2 * 3/2021 Ma ........................ H04L 9/0637
11,102,184 B2 * 8/2021 Ma ........................ H04L 9/0841
(Continued)

FOREIGN PATENT DOCUMENTS

CN       106533675 A    3/2017
CN       106548345 A    3/2017
(Continued)

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Sharif E Ullah
(74) *Attorney, Agent, or Firm* — Davis Wright Tremaine LLP

(57) ABSTRACT

A method of transferring access to a digital asset is disclosed. The method comprises receiving a first blockchain transaction (4) from a first participant (6) by each of a plurality of second participants (8), (10). The first participant (6) has a first private key of a first private-public key pair of a cryptography system, and each participant (6), (8), (10) has a respective first share of a second private key of a second private-public key pair of the cryptography system, and the first blockchain transaction is signed with the first private key. Signature of the first blockchain transaction with the first private key is verified by each second participant (8), (10). A respective first share is applied to the first blockchain transaction to generate a respective second share of a second blockchain transaction signed with the second private key. Signature with the second private key is possible by means (Continued)

of a first threshold number of second shares and is inaccessible to less than the first threshold number of second shares. The first threshold number of second shares is combined from the first participant (6) and a plurality of the second participants (8), (10) generate the signature.

14 Claims, 5 Drawing Sheets

(51) Int. Cl.
*H04L 9/30* (2006.01)
*H04L 9/00* (2022.01)
(52) U.S. Cl.
CPC .............. *H04L 9/3236* (2013.01); *H04L 9/50* (2022.05); *H04L 2209/56* (2013.01)

(56) References Cited

U.S. PATENT DOCUMENTS

| | | | | |
|---|---|---|---|---|
| 11,271,729 | B2* | 3/2022 | Covaci | H04L 9/085 |
| 11,282,325 | B2* | 3/2022 | Cui | H04L 9/3247 |
| 11,431,477 | B2* | 8/2022 | Wright | H04L 9/3213 |
| 2016/0212109 | A1* | 7/2016 | Hird | H04L 63/08 |
| 2016/0344543 | A1* | 11/2016 | Alness | H04L 63/06 |
| 2017/0213210 | A1* | 7/2017 | Kravitz | G06Q 20/3829 |
| 2017/0237570 | A1* | 8/2017 | Vandervort | H04L 63/0442 |
| | | | | 713/176 |
| 2017/0250972 | A1* | 8/2017 | Ronda | H04L 63/0428 |
| 2018/0053161 | A1* | 2/2018 | Bordash | G06Q 20/102 |
| 2018/0054316 | A1* | 2/2018 | Tomlinson | H04L 63/061 |
| 2019/0149336 | A1* | 5/2019 | Lancashire | H04L 9/3239 |
| | | | | 713/176 |
| 2020/0012527 | A1* | 1/2020 | Hartsock | H04L 9/0825 |
| 2020/0313884 | A1* | 10/2020 | Trevethan | G06Q 20/108 |
| 2021/0090072 | A1* | 3/2021 | Sewell | H04L 9/0618 |
| 2021/0119785 | A1* | 4/2021 | Ben-Reuven | H04L 63/126 |
| 2021/0160222 | A1* | 5/2021 | Bartolucci | H04L 9/0841 |
| 2022/0052921 | A1* | 2/2022 | Branton | H04L 47/82 |
| 2022/0070007 | A1* | 3/2022 | Schnabel | H04L 9/0643 |

FOREIGN PATENT DOCUMENTS

| | | | | |
|---|---|---|---|---|
| WO | 2016049406 | A1 | | 3/2016 |
| WO | 2017145010 | A1 | | 8/2017 |
| WO | WO-2017145010 | A1 * | 8/2017 | ............ G06Q 20/36 |
| WO | 2017/149537 | A1 | | 9/2017 |
| WO | 2017151861 | A1 | | 9/2017 |
| WO | 2018007828 | A2 | | 1/2018 |

OTHER PUBLICATIONS

Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.
Gennaro et al., "Robust Threshold DSS Signatures," International Conference on the Theory and Applications of Cryptographic Techniques, May 12, 1996, https://link.springer.com/content/pdf/10.1007%2F3-540-68339-9_31.pdf, 18 pages.
Gennaro et al., "Threshold-Optimal DSA/ECDSA Signatures and an Application to Bitcoin Wallet Security," retrieved from https://eprint.iacr.org/2016/013.pdf, 2016, 42 pages.
Goldfeder et al., "Securing Bitcoin wallets via threshold signatures," retrieved from http://www.cs.princeton.edu/~stevenag/bitcoin_threshold_signatures.pdf, Jun. 3, 2014, 11 pages.
Green et al., "Strength in Numbers: Threshold ECDSA to Protect Keys in the Cloud," Worcester Polytechnic Institute, retrieved from https://eprint.iacr.org/2015/1169.pdf, 2015, 19 pages.
Ibrahim, "SecureCoin: A Robust Secure and Efficient Protocol for Anonymous Bitcoin Ecosystem," International Journal of Network Security 19(2):295-312, http://ijns.jalaxy.com.tw/contents/ijns-v19-n2/ijns-2017-v19-n2-p295-312.pdf, Mar. 2017, 18 pages.
International Search Report and Written Opinion dated Jul. 30, 2019, Patent Application No. PCT/IB2019/052428, 12 pages.
Nakamoto, "Bitcoin: A Peer-to-Peer Electronic Cash System," Bitcoin, Oct. 31, 2008, https://bitcoin.org/bitcoin.pdf, 9 pages.
NChain, "Threshold (Signature) of Greatness—Dr. Craig Wrigh—Hong Kong 2017," Sep. 26, 2017, https://www.youtube.com/watch?v=GUg2mocV9TI, 17 pages.
Satoshi et al., "Connection Limits," Bitcoin Forum, Aug. 9, 2010, https://bitcointalk.org/index.php?topic=741.0; prev_next=prev, 2 pages.
Shamir, "How to Share a Secret," Massachusetts Institute of Technology, 22(11): Nov. 1979, 2 pages.
Shoup, "Practical Threshold Signatures," IBM Zurich Research Lab, May 2000, 14 pages.
Traugott, "What is a Hashed Timeclock Contract (HTLC)?," Captain Altcoin, https://captainaltcoin.com/hashed-timelock-contract-htlc/, Nov. 17, 2019, 7 pages.
UK Commercial Search Report dated Oct. 15, 2018, Patent Application No. GB1805633.3, 8 pages.
UK IPO Search Report dated Oct. 8, 2018, Patent Application No. GB1805633.3, 6 pages.
winbits.us, "Re:BitMedia.IO is a Modern Bitcoin Advertising Platform (Official Support)," Bitcoin Forum, Jun. 30, 2015, Retrieved from: https://bitcointalk.org/index.php?topic=1085968.140, 9 pages.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.

\* cited by examiner

COMPUTER IMPLEMENTED METHOD AND SYSTEM FOR TRANSFERRING ACCESS TO A DIGITAL ASSET

This invention relates generally to the security of data and computer-based resources. More particularly, it relates to cryptocurrencies and cryptography, and also to Elliptic Curve Cryptography, Elliptic Curve Digital Signature Algorithm (ECDSA) and Threshold Cryptography. It can be used to advantage in relation to blockchain-implemented cryptocurrencies such as (for example) Bitcoin but is not limited in this regard, and can have wider applicability. The invention may, in one embodiment, be described as providing a threshold digital signature scheme.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration only, it should be noted that the invention is not limited to use with the Bitcoin blockchain and alternative blockchain implementations and protocols fall within the scope of the present invention.

A blockchain is a peer-to-peer, electronic ledger which is implemented as a computer-based decentralised system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception.

The concept of decentralisation is fundamental to the Bitcoin methodology. Decentralised systems provide the advantage that, unlike distributed or centralised systems, there is no single point of failure. Therefore, they offer an enhanced level of security and resilience. This security is further enhanced by the use of known cryptographic techniques such as Elliptic Curve Cryptography and ECDSA.

Multi-signature systems are commonly used in the Bitcoin blockchain to enhance security, by requiring the signature of more than one party to provide access to a digital asset.

ECDSA threshold signature schemes can replace the 'multi-signature' system for securing Bitcoin wallets, and provide increased security and privacy as well as smaller (and therefore less costly fee) transactions. S. Goldfeder, R. Gennaro, H. Kalodner, J. Bonneau, J. A. Kroll, E. W. Felten, and A. Narayanan—Securing Bitcoin wallets via a new DSA/ECDSA threshold signature scheme (2015) and R. Gennaro et al. *Threshold-optimal DSA/ECDSA signatures and an application to Bitcoin wallet security* (2016), *International Conference on Applied Cryptography and Network Security. ACNS* 2016: Applied Cryptography and Network Security pp 156-174 present variations of a threshold optimal ECDSA signature scheme, such that any t+1 of n key-share-holders may collaborate to produce a full signature interactively, for all $1 < t \leq n$.

However, these schemes suffer from at least two limitations. Firstly, they are dependent on new cryptography and related assumptions, for example fully homomorphic encryption schemes, which has not yet stood the test of time. Secondly, due to their complexity, and involvement of zero-knowledge proofs—for example, at the time of writing, generation and verification of the zero-knowledge proofs alone takes of the order of 10 seconds per participant—they are computationally expensive and therefore slow. As a result, these systems should not be trusted to secure large deposits, and are not suitable for certain applications which require fast signing (such as exchange operations).

For example, these schemes could not be used in high-frequency payment channel based systems, for example as disclosed in J Poon; T Dryja; *The Bitcoin Lightning Network: Scalable Off-Chain Instant Payments* (2016). Cryptocurrency exchanges are one application for bi-directional payment channels, and one in which fast signing is particularly desirable.

There exist faster, less complex and more secure schemes for generation of ECDSA threshold signatures but which come with certain restrictions. In particular, certain combinations of t and n are excluded, including popular choices such as the '2 of 3' scheme. Moreover, in these schemes it is possible to reconstruct the private key with fewer key shares than are required to generate a signature through the combination of partial signatures. There is therefore a need for an improvement to a secure wallet service system employed by Bitcoin exchanges, which employ the '2 of 3' multi-signature technology.

Bi-directional payment channels, for example as described in J Poon; T Dryja; *The Bitcoin Lightning Network: Scalable Off-Chain Instant Payments* (2016), can permit trading of assets while drastically reducing the trust that the client must place in the exchange. In the traditional model, a client may hold deposits of, say, Bitcoin and fiat currency at an exchange. As the client trades, the proportion of Bitcoin and fiat that they own varies. However, these proportions depend on the trades as recorded by the exchange, and therefore the client must trust the exchange to keep an accurate record. In other words, although deposits of Bitcoin (and, if tokenised, fiat) may be protected from theft (to some degree) by employing an escrow service, the client could still lose their deposits if the exchange were to be compromised and records of trades lost or altered.

Bi-directional payment channels suffer from a number of further disadvantages. Consider a standard implementation of a bi-directional payment channel. Alice and Bob want to send cryptographic tokens back and forward between themselves. They each fund a '2 of 2' multi-signature with an agreed number of tokens, and tokens are then sent (the channel is updated) by exchanging commitment transactions, together with 'values' which effectively invalidate previous states of the channel. If an outdated commitment transaction were to be broadcast by one party, the other party could respond with a 'breach remedy transaction', which contains the appropriate 'value', and thereby claim the entirely of the balance in the channel.

When either Alice of Bob want to settle the channel, they may each agree to sign a transaction which distributes the balance according to the latest channel state (a so called 'soft resolution'). In this way, the commitment transactions need never be broadcast, so long as both parties are cooperative.

However, payment channels as described in J Poon; T Dryja; *The Bitcoin Lightning Network: Scalable Off-Chain Instant Payments* (2016) have a major unresolved vulnerability in that there is a so called 'failure mode', which may occur if a party who has a large number of channels open is rendered unresponsive for a prolonged period. This may induce the other parties connected to them to broadcast commitment transactions, and if the number of parties is large, the blockchain network may become overwhelmed. Such a situation is particularly dangerous in the context of payment channels, since malicious parties may attempt to steal funds by broadcasting an outdated commitment transaction in the hope that the party to which they are connected will be unable to respond in time with a breach remedy transaction. Another limitation of the arrangement described in J Poon; T Dryja; *The Bitcoin Lightning Network: Scalable Off-Chain Instant Payments* (2016) is the further complication that it requires Segregated Witness (to avoid the possibility that one of both parties are unwilling or unable to provide the first commitment transaction after the channel is funded).

BACKGROUND

State of the Art in Exchange Security

Many cryptocurrency exchange platforms currently employ secure wallet systems based on the multi-signature functionality of Bitcoin script, often via third party services such as that supplied by BitGo. These systems place client or exchange funds under outputs that can be redeemed with a 2-of-3 multi-signature script (i.e. by supplying valid signatures corresponding to any 2 of 3 public keys). The three corresponding private keys would be distributed to the exchange, the client and the trusted third party/escrow (BitGo). The movement of funds (via a signed valid transaction) could then be authorised by either: i) the client and the exchange or ii) the exchange and BitGo (in the case that the client was uncooperative or had lost their keys). The BitGo service would perform signature operations via an authenticated API request from the exchange.

This custodial system has several major drawbacks, in addition to the security operations and policies of BitGo itself and its application programming interface (API). Firstly, the use of a 2-of-3 multisig output compromises the privacy of both the client and the exchange. The number of 2-of-3 multisig transaction outputs is a small fraction of the total number of outputs, as a result of which this reduced anonymity makes it easier for observers of the blockchain to identify funds associated with BitGo and exchange wallets. In addition, the use of a 2-of-3 multisig output also reveals internal exchange operations on the blockchain. External observers can determine which of the three keys has been used to authorise a particular transaction, based on their position within the script. For example, in the $60 m Bitfinex hack of 2016 (which employed a 2-of-3 multisig BitGo wallet system) Bitcoin blockchain observers were able to determine that keys 1 and 3 were used to steal the funds. Furthermore, the use of the 2-of-3 multisig results in a much larger transaction size, and therefore requires a larger transaction (miner) fee in order to be reliably and quickly confirmed on the blockchain. Also, since 2-of-3 multisig scripts are considered 'non-standard' in the Bitcoin client, they must be implemented as a redeem script in the pay-to-script-hash (P2SH) format. The P2SH transaction output type is fundamentally less secure than a standard pay-to-public-key-hash (P2PKH) output due to possibility of it being subjected to a collision attack (or so-called 'birthday attack). The P2SH output has 160 bits of security in Bitcoin, which means that a collision attack is prevented with only 80 bits of security. This level of security is not computationally feasible to attack at the present time, but that may not remain the case indefinitely. Collision attacks are not possible on a P2PKH output (which uses just a single public key), and so retain 160 bits of security (in the case of a pre-image attack).

Threshold Signature Schemes

Threshold signature protocols enable a group of parties (or nodes) to collectively sign a transaction using a threshold m of n key shares without reconstructing the private key at any point, or any participant learning anything about any other party's key share. The use of such a scheme prevents a single point of failure in systems that require a number of separate parties to authorise a transaction.

A threshold signature scheme can be combined with a dealer-free (or dealer-less) protocol for establishing the secret shares, where the shared secret (the private key) is unknown to any party (in fact, it does not need to ever explicitly exist in memory at any point). However, it is possible for the group to determine the elliptic curve public key (corresponding to the as yet unknown, but implied, shared secret key). This means that a Bitcoin output can be put under the control of a shared group public key (and corresponding address) in a completely trustless way, and a signature on a transaction can only be generated when a threshold of parties collaborates, without any individual party learning the private key.

The nature of the mathematical form of the Elliptic Curve Digital Signature Algorithm (ECDSA) means that it is not trivial to construct a secure threshold scheme for this type of signature. In particular, it has proven impossible to create an efficient and secure threshold optimal scheme—where the number of key shares that are required to generate a valid signature is the same as the number of shares required to reconstruct the full private key. The first method to construct a threshold optimal ECDSA scheme was described in S. Goldfeder, R. Gennaro, H. Kalodner, J. Bonneau, J. A. Kroll, E. W. Felten, and A. Narayanan. Securing Bitcoin wallets via a new DSA/ECDSA threshold signature scheme (2015), but this scheme has significant disadvantages. Firstly, it is very inefficient: the signature generation requires both invocation of Paillier (additively homomorphic) encryption and the creation and verification of a series of zero-knowledge proofs: for just a 2-of-2 signature, it requires 6 rounds of communication and a computation time of 10 seconds (per party). Secondly, the private key is shared multiplicatively: this means that only an n-of-n key sharing is possible—to realise a m-of-n scheme with m<n requires a combinatorial key-sharing structure with each party required to hold multiple key shares (each party requires nm key shares). In addition, to share a private key multiplicatively without a trusted dealer is much more complex and computationally expensive than if the key is shared on a polynomial (as in Shamir's secret sharing scheme).

More recently, a threshold optimal ECDSA scheme with improved efficiency (but still relatively slow) has been proposed in R. Gennaro et al. *Threshold-optimal DSA/ECDSA signatures and an application to Bitcoin wallet security* (2016). International Conference on Applied Cryptography and Network Security. ACNS 2016: Applied Cryptography and Network Security pp 156-174 and Boneh, Dan, Rosario Gennaro, and Steven Goldfeder. "Using Level-1 Homomorphic Encryption To Improve Threshold DSA Signatures For Bitcoin Wallet Security." which employs a fully homomorphic encryption system. This cryptographic primitive has a high degree of complexity and relies on relatively un-tested assumptions. It should also be noted that other recent fully homomorphic encryption schemes have been subject to successful cryptanalysis and are effectively broken, for example as described in Bogos, Sonia, John Gaspoz, and Serge Vaudenay. "Cryptanalysis of a homomorphic encryption scheme." ArcticCrypt 2016. No. EPFL-CONF-220692. 2016 and Hu, Yupu, and Fenghe Wang. "An Attack on a Fully Homomorphic Encryption Scheme." IACR Cryptology ePrint Archive 2012 (2012): 561.

Preferred embodiments of the present invention seek to overcome one or more of the above disadvantages of known schemes.

The present invention provides method(s) and system(s) as defined in the appended claims.

There may be provided a method of transferring access to a digital asset, the method comprising:—
receiving a first blockchain transaction from a first participant by each of a plurality of second participants, wherein said first participant has a first private key of a first private-public key pair of a cryptography system, and each said participant has a respective share of a second private key of a second private-public key pair of the cryptography system, wherein said first blockchain transaction is signed with said first private key;
verifying, by a plurality of said second participants, that said first blockchain transaction has been signed with said first private key;
applying a respective said share of said second private key to said first blockchain transaction to generate a respective share of a first secret value, wherein said first secret value is a second blockchain transaction signed with said second private key, wherein said first secret value is accessible to a first threshold number of said shares of said first secret value and is inaccessible to less than said first threshold number of shares of said first secret value; and
combining at least said first threshold number of said shares of said first secret value from said first participant and a plurality of said second participants to generate said first secret value.

By applying a respective share of a second private key to the first blockchain transaction to generate a respective share of a second blockchain transaction signed with the second private key, wherein the signed second blockchain transaction is accessible to a first threshold number of shares of said first secret value and is inaccessible to less than the first threshold number of shares, and combining at least the first threshold number of shares of the first secret value from the first participant and a plurality of second participants to generate the signed second blockchain transaction, this provides the advantage of enabling signature of the transaction if one of the second participants should become inactive or uncooperative, thereby improving security and reliability of the system. Also, by generating a share of said first secret value in response to receipt of the first blockchain transaction from the first participant, this provides the further advantage of enabling that share of the first secret value to be automatically generating so that at least three shares of the first secret value are generated, thereby enabling emulation of a 2 of 3 signature scheme.

Each of a plurality of said second participants may have a respective private key of the cryptography system.

This provides the advantage of enabling verification of signatures with the private key by means of the public key corresponding to the private key, thereby enhancing security of the system.

The method may further comprise distributing shares of a said share of said second private key in possession of said first participant among said first participant and at least one said second participant.

This provides the advantage of further enhancing security.

The method may further comprise transferring access to said digital asset to a third private key of said cryptography system in the event of a said second participant becoming unresponsive.

The digital asset may remain under control of said third private key for a predetermined time.

The method may further comprise distributing said shares of said second private key among a plurality of said participants.

There may be provided a method of transferring access to a digital asset, the method comprising:
sending a first blockchain transaction from a first participant to a plurality of second participants, wherein said first participant has a first private key of a first private-public key pair of a cryptography system, and each said participant has a respective share of a second private key of a second private-public key pair of the cryptography system, wherein said first blockchain transaction is signed with said first private key;
receiving, from a plurality of said second participants, a respective share of a first secret value, wherein said first secret value is a second blockchain transaction signed with said second private key, wherein said first secret value is accessible to a first threshold number of said shares of said first secret value and is inaccessible to less than said first threshold number of shares of said first secret value, wherein each said share of said second private key is applied to said second blockchain transaction after verification, by the corresponding said second participants, that said first blockchain transaction has been signed with said first private key; and
combining at least said first threshold number of said shares of said first secret value from said first participant and a plurality of said second participants to generate said first secret value.

There may be provided a method of digitally signing a message, the method comprising:—
distributing first shares of a first secret value among a plurality of participants, wherein the first secret value is a private key of a public-private key pair of a cryptography system, said private key is accessible by means of a first threshold number of said first shares, and is inaccessible to less than said first threshold number of said first shares;
distributing second shares of a second secret value among said plurality of participants, wherein said second secret value is an ephemeral key for use in generating digital signatures, wherein said ephemeral key is accessible by means of said first threshold number of said second shares and is inaccessible to less than said first threshold number of said second shares; and
distributing third shares of a third secret value among said plurality of participants, wherein each said third share is adapted to be applied to a message to generate a respective fourth share of a fourth secret value, wherein said fourth secret value is the message signed with said private key and using said ephemeral key, and wherein said fourth secret value is accessible by means of a second threshold number of said fourth shares, and is inaccessible to less than said second threshold number of said fourth shares.

By distributing third shares of a third secret value among the plurality of participants, wherein each third share is adapted to be applied to a message to generate a respective fourth share of a fourth secret value, being the message signed with the private key and the ephemeral key, wherein the fourth secret value is accessible by means of a second threshold number of fourth shares, and is inaccessible to less than the second threshold number of fourth shares, this provides the advantage of enabling a substantial proportion of the digital signature shares to be generated in advance, and applied to a message when required for rapid signature.

This in turn enables rapid non-interactive signature of transactions and is therefore suitable for use in an exchange.

The shares distributed to each said participant may be inaccessible to each other said participant.

The step of distributing said shares to each said participant may comprise providing a respective encrypted communication channel with the or each said participant.

The first and/or second shares may be created by means of respective Shamir secret sharing schemes.

A plurality of said first and/or second shares may be respective values of a first polynomial function, and corresponding secret value may be determined by deriving the polynomial function from said first threshold number of said shares.

At least one said first and/or second secret value may be shared among a plurality of said participants by means of joint random secret sharing (JRSS).

Sharing at least one said third secret value may include sharing masking shares generated by joint zero secret sharing (JZSS).

The cryptography system may be an elliptic curve cryptography system, wherein said public key of each said public-private key pair is related to the corresponding private key by multiplication of an elliptic curve generator point by said private key.

According to a further aspect of the present invention, there is provided a computer implemented system for carrying out a method as defined above.

An embodiment of the present invention will now be described, by way of example only and not in any limitative sense, with reference to the accompanying drawings, in which:—

SYSTEM OVERVIEW

Figure 1:
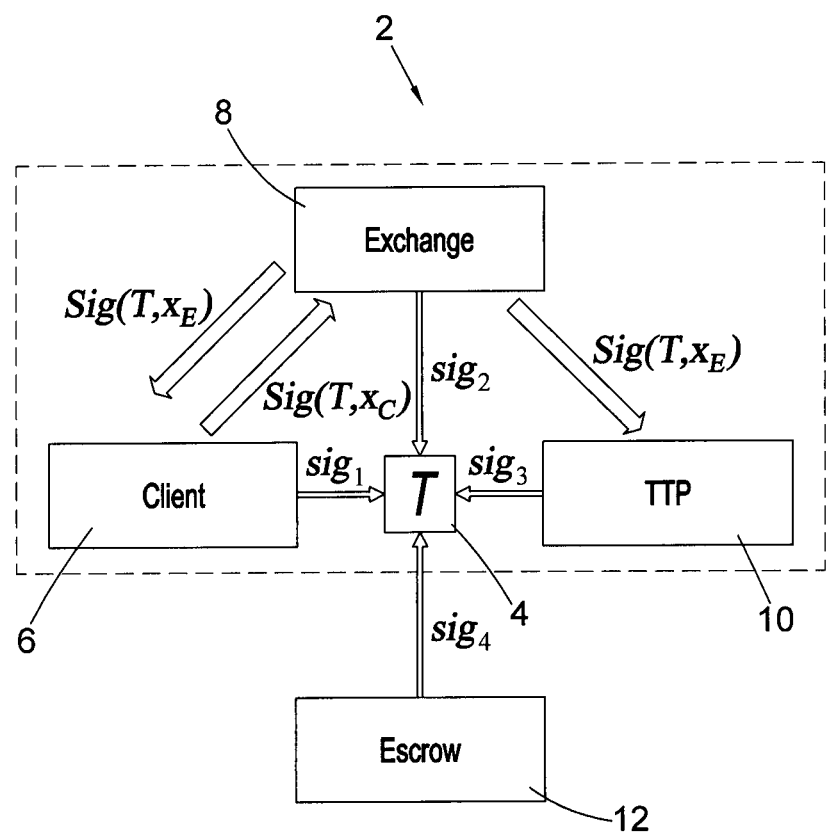
FIG. 1 is a digital signature system embodying the present invention.

Referring to FIG. 1, a system 2 embodying the present invention for carrying out rapid signature of blockchain transactions 4 has four parties in a threshold signature scheme, the parties being a client 6, an exchange 8, a trusted third party (TTP) 10 and an escrow 12. Each party has a respective elliptic curve public/private key pair $(y_C, x_C)$, $(y_{Ex}, x_{Ex})$, $(y_T, x_T)$, $(y_{Es}, x_{Es})$ respectively. Compared to the typical '2 of 3' escrow arrangement of the prior art, the present invention features an additional party, the TTP 10. As explained in greater detail below, the TTP 10 is required to participate in the generation of every signature that does not involve the Escrow 12 (in case of fault resolution).

The TTP 10 is required to have a fast (low latency) and reliable connection with the Exchange 8, and the TTP 10 should be physically separate from all other parties.

Secure communication channels enabling both encryption and authentication are then established between the client 6 and exchange 8, the exchange 8 and TTP 10, the client 6 and TTP 10, and the exchange 8 and escrow 12. These communication channels establish shared secrets that can that can be periodically updated without additional communication using the method described in International Patent Application WO 2017/145016.

The parties hold secret key shares $x_n$; n=1, 2, 3, 4 in a threshold private key x; the shares are generated distributively (i.e. without a trusted dealer), according to a method described in greater detail below so that the full private key never exists in a single place. These shares (along with the signature initialisation) may be used to generate a partial signature (or signature share) $sig_n$; n=1, 2, 3, 4 on a message m (a Bitcoin transaction hash). The TTP will provide a partial signature on any transaction in response to an authenticated request from the Exchange 8. It follows that, the '3 of 4' threshold scheme effectively emulates a '2 of 3' multi-signature. One further possibility is for there to be restrictions on the types of transaction that TTP 10 will partially sign. For example, the TTP 10 should only sign transactions sending to certain addresses. This arrangement has the advantage that TTP 10 would not need to know anything about the transaction and could therefore 'sign it blind'. Also, this scheme mimics the '2 of 3' structure of BitGo most closely.

Parties 2, 3 and 4 are assumed to employ trusted hardware, such that their share in the threshold private key is generated within a protected 'enclave'. Messages can be sent into the enclave and a (partial) signature on the message may be output if certain conditions are met, but the private key share never leaves the enclave. In this scheme, the threshold private key can be reconstructed given two private key shares. However, with the use of trusted hardware, such an attack would require prolonged physical access to two sets of hardware at a time when both pieces of hardware contain key shares of the same generation. Therefore, such an attack would be very difficult to realise in practice.

Basic Operation of the Exchange

Referring to FIG. 1, the high-level function of the threshold wallet in relation to exchange operations is as follows:

1. Client 6 deposits some Bitcoin B in to an account associated with the (dealer-less) public key produced by the threshold scheme.
2. Various trades are executed, leaving a proportion f of B belonging to the Client 6.
3. Settlement is requested (either by the Client 6 or by the Exchange 8). Let us say that it is the Exchange 8 requesting settlement, and that the correct distribution of funds is encoded in transaction T.
4. T and Sig $(T, x_{Ex})$ are sent, by the Exchange 8, to TTP 10.
5. If Sig $(T, x_{Ex})$ verifies, TTP 10 sends their partial signature on T (denoted $sig_3$) to the Exchange 8. TTP 10 does not need to know the information contained in T, and in fact, it would be better from a security point of view if they did not. This could be achieved via a partial blind signature operation.
6. Meanwhile, if the request is deemed authentic (Sig $(T, x_E)$ verifies), and they agree with the content of T, the Client 6 sends Sig $(T, x_C)$, $sig_1$, Sig $(sig_1, x_C)$ to the Exchange 8.
7. If the signatures verify, the Exchange 8 combines $sig_2$, $sig_1$, $sig_3$, and checks that the signature Sig $(T, x)$ verifies; if so, T,Sig(T,x) are broadcast to the blockchain network.

Secure Wallet Protocol

This section describes the protocol for the creation of the secure wallet and then the threshold signing operation. The protocol is described in terms of the high-level primitives that are described in detail in R. Gennaro, S. Jarecki, H.

Krawczyk, and T. Rabin. Robust threshold DSS signatures. *In International Conference on the Theory and Applications of Cryptographic Techniques,* 354-371 (1996).

Dealer-Free Key Generation

The creation of the secure wallet is initiated with a re-initialisation of the secure communication channels between the 4 participants in the scheme (as described in International Patent Application WO 2017/145016).

The Exchange 8 then coordinates the dealer-free generation of a shared elliptic curve public key, where each of the 4 participants will hold shares in the corresponding secret key (on a degree 1 polynomial). Two of these four shares are sufficient to reconstruct the private key, but this operation is impossible, even with the collusion of two of the participants if the key shares are protected in trusted execution environments. The only possible way to authorise a transaction is via the generation of a threshold signature involving three of the four parties.

Figure 2:
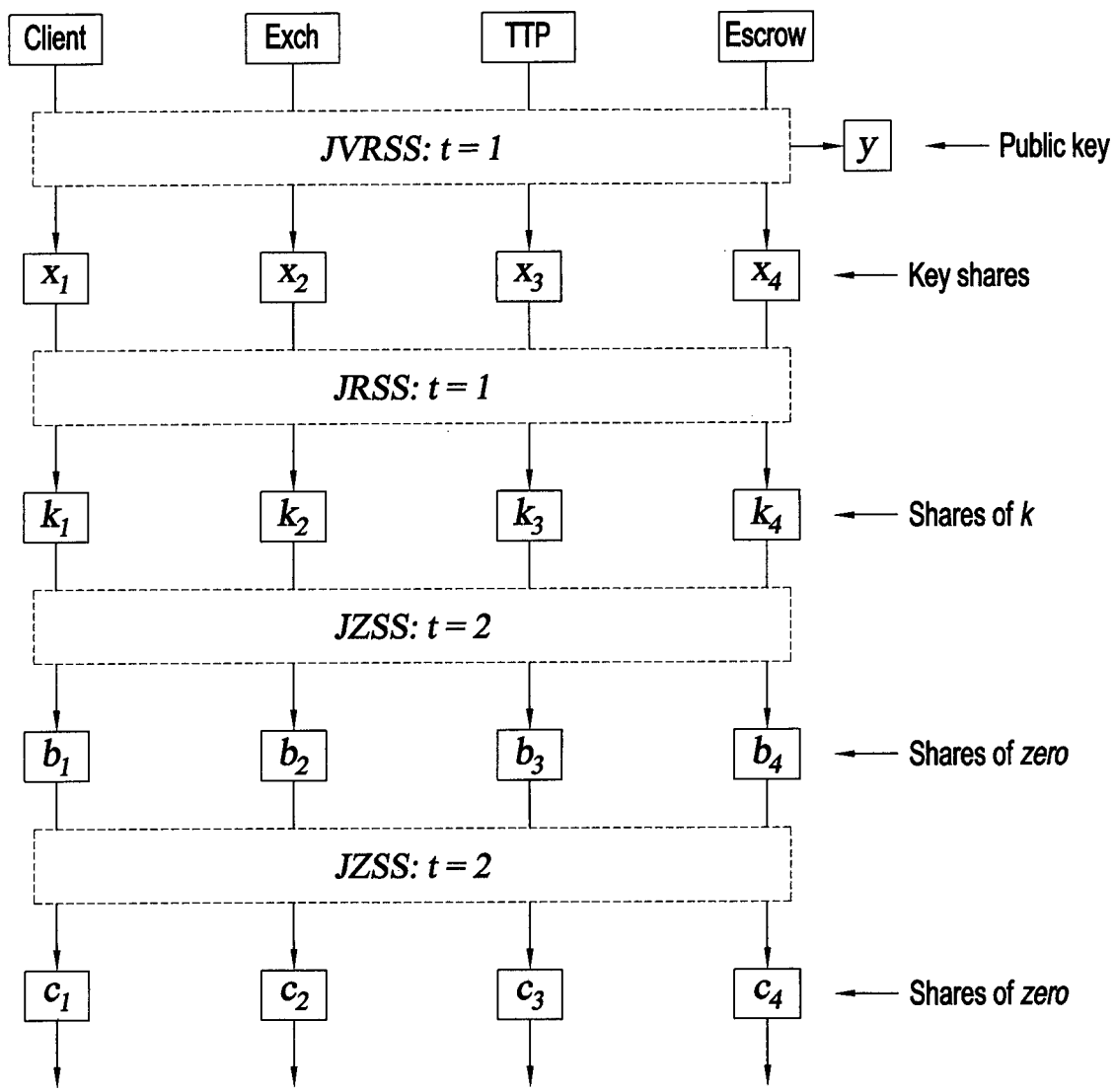
FIG. 2 is a process for generating shares of a digital signature for use in the process of FIG. 1.
Figure 2:
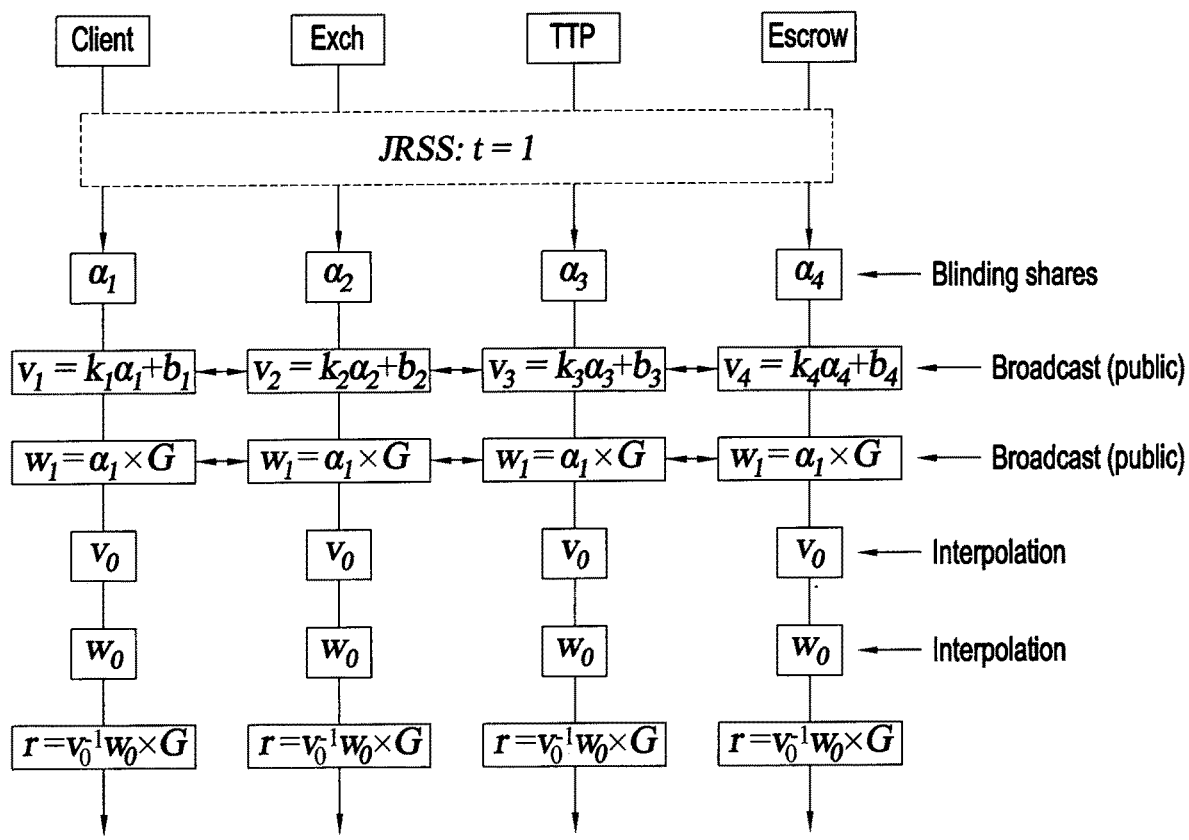

The key generation involves running the Joint Verifiable Random Secret Sharing (JVRSS) protocol to create the shared polynomial, and the corresponding shared public key y via the Exp-Interpolate procedure with each party having a share $(x_i)$ on the polynomial. The Exp-Interpolate procedure is the recovery of the shared secret, multiplied by the elliptic curve generator point, from at least a threshold number of shares, multiplied by the elliptic curve generator point, i.e. using a similar technique (i.e. Lagrange interpolation) which would be used to recover the shared secret from the threshold number of shares. Unconditionally secure verification of the secret shares is ensured by performing the protocol of Pedersen [Pedersen 1991]. This process is illustrated in FIG. 2. Once the key generation has been verifiably performed, the client (or exchange) pays funds to the shared public key (the corresponding Bitcoin address for y), which is then confirmed by the exchange (or Client). It should be noted that the parameter r is calculated from the x-coordinate of $w_0$.

Ephemeral Key Sharing

To enable rapid and non-interactive signature generation on a given transaction, the ephemeral key (k) shares and secret share multiplication necessary to construct the signature can be generated in advance of the signing procedure. This means that once a signature is required, each party only needs to calculate their signature share (given a particular transaction hash m) which can then be broadcast and interpolated by anyone to generate the full signature.

FIG. 2 shows this 'pre-signing' procedure in terms of Joint Random Secret Sharing (JRSS) protocols (sharing an unknown random value), and Joint Zero Secret Sharing (JZSS) protocols (sharing zero with random shares—used for masking). The operations shown in FIG. 2 are performed to jointly compute the value of r from the ephemeral key shares without any party learning the full ephemeral key.

The shared key generation and the 'pre-signing' arrangement described here can be performed in parallel at the same time, saving significantly on communication latency.

Signature Generation

Figure 3:
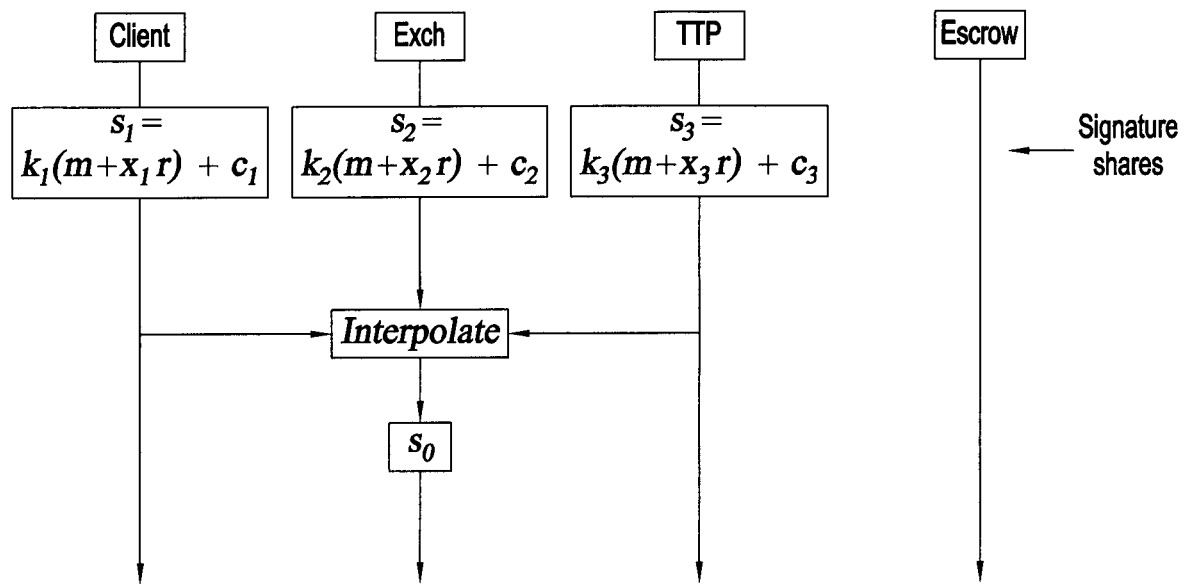
FIG. 3 is a process of generating a digital signature from the shares generated in the process of FIG. 2.

As shown in FIG. 3, the generation of a valid signature (for the shared public key y) requires the consent of 3 parties (the signature will be interpolated from 3 points on the degree 2 (t=2) signature share polynomial). In normal operation, the shares will be produced by the Client 6, the Exchange 8 and the TTP 10. The full signature interpolation (Lagrange) can performed by any party, but in the present embodiment is performed by the exchange 8 (or client 6), who will compile the final transaction and broadcast it to the network. FIG. 3 shows each party computing the signature share and then broadcasting it. This share can be public—it contains no information about the private or ephemeral key shares, or any other identifying information due to the masking shares (of zero) $c_i$. A more detailed explanation of the key share scheme used to distribute the key and signature shares shown in FIG. 2 is described in Appendix 1.

Client Key Management

Figure 4:
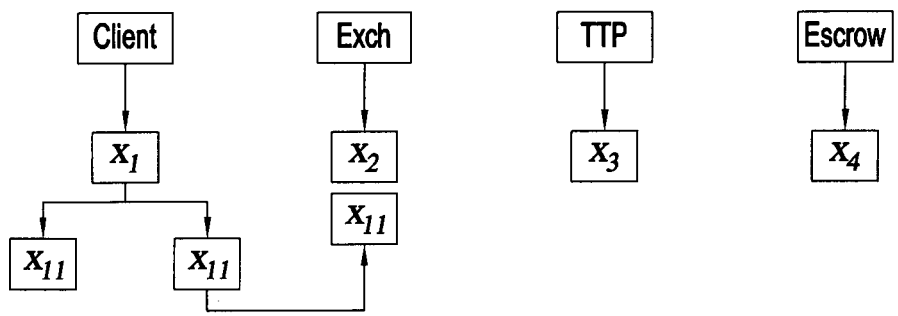
FIG. 4 shows a process for splitting a share of a private key.

In addition to the security benefits from a dealer free shared key for the secured funds, the security for the client can be further enhanced by splitting the client key share. This process is shown in FIG. 4. Once established from the Joint Verifiable Random Secret Sharing (JVRSS) protocol, the client key share $(x_1)$ can itself be split into two or three sub-shares. The splitting is performed according to the protocol described in International Patent Application WO 2017/145010. Once the key share has been split, it is securely deleted. The sub-key shares are then sent to different devices to enable two-factor authentication (2FA) in order to authorise transaction signing. A further security enhancement can be achieved by the exchange storing one of the client sub-key shares—therefore both the client (via 2FA) and the exchange is required to consent the providing the client partial signature.

Resolution in case of malicious/unresponsive parties

Unresponsive Client

Figure 5:
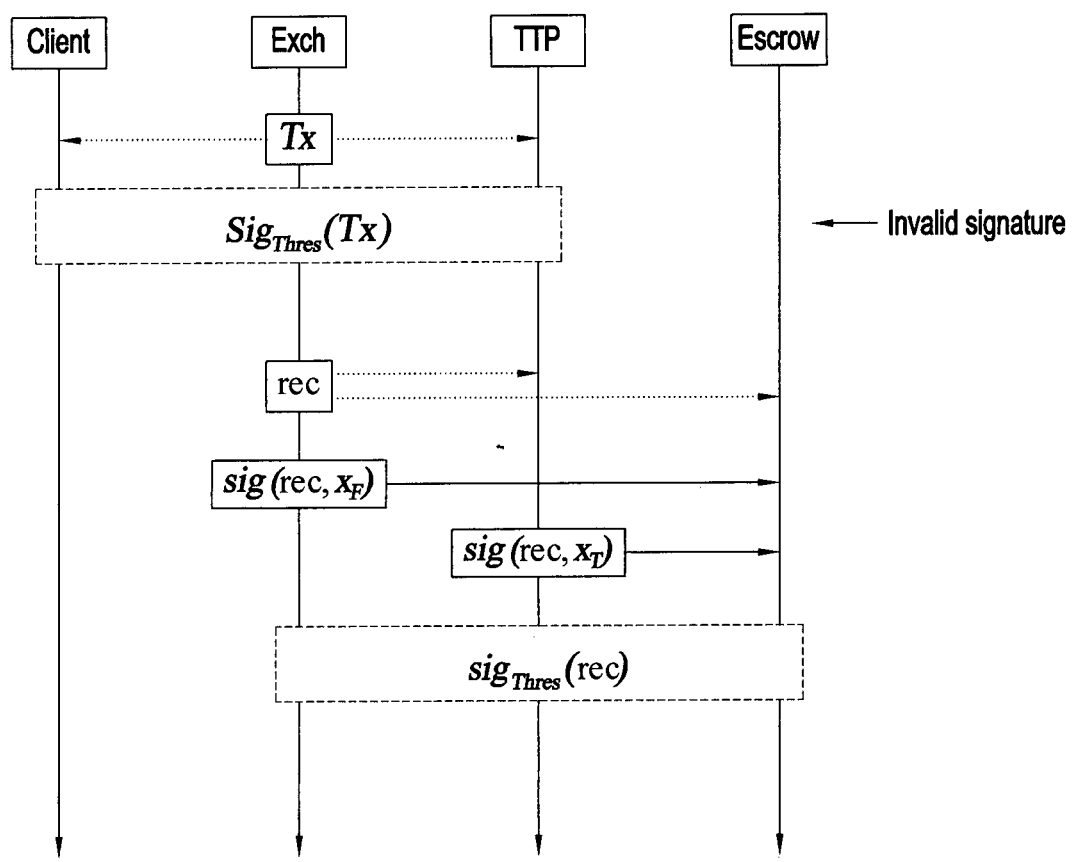
FIG. 5 shows a process for executing digital signature in the case of an unresponsive or malicious participant.

Referring to FIG. 5, in this case, the Exchange 8 must involve the Escrow 12 in order to construct the threshold signature on T. The situation is the same as would arise for BitGo. The procedure for convincing the Escrow 12 to participate can be relatively slow and involve multiple checks (for example, to guard against the possibility that security of the Exchange 8 has been compromised). For additional security, the Escrow 12 could be configured to (initially) only provide a partial signature on a transaction which moves the funds to a special 'holding account' (recovery address: rec), also secured under a threshold signature, where they must remain for a period of time. The significance of this account may be known only to the parties of the threshold scheme. This precaution would give the Client 6 time to intervene, for example, if they had been wrongly deemed unresponsive.

Malicious Client

Also with reference to FIG. 5, a malicious client 6 acts to prevent the generation of a valid threshold signature (and therefore the transfer of funds) by providing a signature share (i.e. $s_1$) that is invalid. When the 3 signature shares are combined to form the full signature, it will be immediately apparent that the signature is incorrect (by failed validation with the shared public key). The initial step in this case is to identify which of the three signature shares $(s_1, s_2$ or $s_3)$ is invalid. This can be done iteratively: the exchange 8, TTP 10 and Escrow 12 can attempt to sign a transaction to the recovery address, and if this fails a signature can be generated shares from the client 6, TTP 10 and Escrow 12 (i.e. the exchange 8 share is malicious). Alternatively, a signature share verification scheme can be employed.

The present invention enables a secure wallet service system employed by Bitcoin exchanges, which employ the '2 of 3' multi-signature technology, to be effectively replaced (and improved) by a scheme based on threshold signatures employing polynomial secret sharing. The present invention is also compatible with trading via payment channels since it allows for signing at high frequency (in contrast to S. Goldfeder, R. Gennaro, H. Kalodner, J. Bonneau, J. A. Kroll, E. W. Felten, and A. Narayanan. Securing Bitcoin wallets via a new DSA/ECDSA threshold signature scheme (2015) and R. Gennaro et al. *Threshold-optimal*

DSA/ECDSA signatures and an application to Bitcoin wallet security (2016). International Conference on Applied Cryptography and Network Security. ACNS 2016: Applied Cryptography and Network Security pp 156-174, for example).

The present invention can also be made robust against the possibility of an unresponsive exchange. Because the TTP sees (and provides partial signature on) every commitment transaction, TTP always knows current channel state; this means TTP can collaborate with Escrow and Client to provide an orderly sequence of soft resolutions in event that exchange is rendered unresponsive, thus avoiding 'failure mode' described above.

The present invention also avoids the need for Segregated Witness, by exchanging the first commitment transactions by embedding them in an on-chain transaction. The Escrow monitors the blockchain for these transactions, and collaborates with the appropriate parties to provide refunds if the relevant transactions are not observed before timeout.

It should be noted that the availability and security of any of the parties (and therefore the system as a whole) may be enhanced by further sharing their private key and/or share in the threshold private key between members of a (private) 'Congress'. For example, the Escrow may initiate a refund if the required ECTs are not observed on the blockchain. In this case, the difficulty of the blocks can be checked inside TEEs belonging to members of the Congress, and a Ghostchain may be instantiated to construct the (partial) signature on the refund transaction if and only if commitment transactions are not observed within a certain number of blocks after the channel is funded.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

APPENDIX 1—DETAILED DESCRIPTION OF KEY SHARE AND SIGNATURE SHARE GENERATION

Algorithm 1—Key Generation
Domain Parameters (CURVE, Cardinality n, Generator G)
Input: NA
Output: Public Key $Q_A$
Private Key Shares $d_{A(1)}, d_{A(2)}, \ldots, d_{A(j)}$ For a threshold of k slices from (j) participants, a constructed key segment $d_{A(i)}$ is constructed which is associated with participant (i) and (j−1) participants nominated as participant (h) that are the other parties that participant (i)exchanges secrets with to sign a key (and hence a Bitcoin transaction).

In the scheme, j is the total number of participants where k≤j and hence h=j−1

Hence, there is a (k,j)—threshold sharing scheme.
The method for algorithm 1 follows:

1) Each participant $p_{(i)}$ of (j) where 1≤i≤j exchanges an ECC public key with all other participants. This address is the Group identity address and does not need to be used for any other purpose.

2) Each participant $p_{(i)}$ selects a polynomial $f_i(x)$ of degree (k−1) with random coefficients in a manner that is secret from all other parties.

This function is subject to a first secret value in the form of the participant's secret $a_0^{(i)}$ that is selected as the polynomial free term. This value is not shared.

$f_i(h)$ is defined to be the result of the function, $f_{(x)}$ that was selected by participant $p_{(i)}$ for the value at point (x=h), and the base equation for participant $p_{(i)}$ is defined as the function:

$$f_{(x)} = \Sigma_{p=0}^{(k-1)} a_p x^p \bmod n$$

In this equation, $a_0$ is the secret for each participant $p_{(i)}$ and is not shared.

Hence, each participant $p_{(i)}$ has a secretly kept function $f_i(x)$ that is expressed as the degree (k−1) polynomial with a free term $a_0^{(i)}$ being defined as that participant's secret such that:

$$f_i(x) = \Sigma_{\gamma=0}^{(k-1)} a_\gamma x^\gamma \bmod n$$

3) Each participant $p_{(i)}$ encrypts first shares $f_i(h)$ to participant $P_{(h)}$ ∀h={1, ..., (i−1), (i+1), ..., j} using $P_{(h)}$'s public key as noted above and exchanges the value for $P_{(h)}$ to decrypt. Each participant $P_i$ sets up a respective secure encrypted communication channel with each other participant $P_j$, for example by means of a method disclosed in international patent application WO 2017/145010.

4) Each participant $P_{(i)}$ broadcasts the values below to all participants.

$$a_\kappa^{(i)} G \forall \kappa = \{0, \ldots, (k-1)\} \quad \text{a)}$$

$$f_i(h) G \forall h = \{1, \ldots, j\} \quad \text{b)}$$

5) Each participant $P_{(h \neq 1)}$ verifies the consistency of the received shares with those received from each other participant.

That is: $\Sigma h^\kappa a_\kappa^{(i)} G = f_i(h) G$

And that $f_i(h) G$ is consistent with the participant's share.

6) Each participant $P_{(h \neq i)}$ validates that the share owned by that participant ($P_{(h \neq i)}$) and which was received is consistent with the other received shares:

$$a_0^{(i)} G = \Sigma_{h \in B} b_h f_i(h) G \forall P_{(h \neq i)}$$

In effect, this step consists of carrying out, on the elliptic curve encrypted versions of the shares $f_i(h)$ (i.e. $f_i(h)G$), the operation which, if carried out on the unencrypted versions of $f_i(h)$, would recover the secret value $a_0^{(i)}$, to recover G $a_0^{(i)}$. In the case of a Shamir secret sharing scheme, therefore, the coefficients $b_h$ represent the Lagrange interpolation coefficients necessary to recover the secret from its corresponding shares.

If this is not consistent, the participant rejects the protocol and starts again. In addition, because each participant $P_j$ communicates with participant $P_1$ by means of its own encrypted communication channel, it is possible to identify which participant Pj is associated with any inconsistent shares.

7) Participant $p_{(i)}$ now either calculates their share $d_{A(i)}$ as:

$$SHARE(p_{(i)}) = d_{A(i)} = \Sigma_{h=j}{}^{j} f_h(i) \bmod n$$

Where $\Sigma_{h=j}{}^{j} f_h(i) \bmod n$ are second shares in respective second secret values $a_0$ received from each participant $P_{(h \neq i)}$ And where: SHARE $(p_{(i)}) \in Z_n$ and $d_{A(j)}$
Where: $Q_A = $ Exp-Interpolate$(f_1, \ldots, f_j) \triangleright [=G \times d_A]$
And where the operation Exp-Interpolate( ) is defined as the operation which recovers the elliptic curve encrypted secret from the elliptic curve encrypted shares.

Return $(d_{A(i)}, Q_A)$

Participant $p_{(i)}$ now uses the share in calculating signatures. This role can be conducted by any participant or by a party $p_{(c)}$ that acts as a coordinator in the process of collecting a signature. The participant $p_{(c)}$ can vary and does not need to be the same party on each attempt to collect enough shares to sign a transaction.

Hence private key shares $d_{A(i)} \leftarrow Z_n^*$ have been created without knowledge of the other participant's shares.

Algorithm 2—Updating the Private Key

Input: Participant $P_i$'s share of private key $d_A$ denoted as $d_{A(i)}$.

Output: Participant $P_i$'s new private key share $d_{A(i)}$.

Algorithm 2 can be used to both update the private key as well as to add randomness into the protocol.

1) Each participant selects a random polynomial of degree $(k-1)$ subject to zero as its free term. This is analogous to Algorithm 1 but that the participants must validate that the selected secret of all other participants is zero. Generate the zero share: $z_i \leftarrow Z_n^*$
2) $d_{A(i)}' = d_{A(i)} + z_i$
3) Return: $d_{A(i)}'$ The result of this algorithm is a new key share that is associated with the original private key. A variation of this algorithm makes the ability to both increase the randomness of the first algorithm or to engage in a re-sharing exercise that results in new key slices without the need to change the bitcoin address possible. In this way, the invention allows a group to additively mask a private key share without altering the underlying private key. This process can be used to minimise any potential key leakage associated with the continued use and deployment of the individual key shares without changing the underlying bitcoin address and private key.

Algorithm 3—Signature Generation

Domain Parameters: CURVE, Cardinality n, Generator G
Input: Message to be signed $e = H(m)$
Private Key Share $d_{A(i)} \in Z_n^*$
Output: Signature
$(r,s) \in Z_n^*$ for $e = H(m)$ A) Distributed Key Generation
1) Generate the ephemeral key shares using Algorithm 1:

$$D_{k(i)} \leftarrow Z_n^*$$

2) Generate Mask shares using Algorithm 1:

$$\alpha_i \leftarrow Z_n$$

3) Generate Mask shares with Algorithm 2:

$$b_i, c_i \leftarrow Z_n^2$$

The shares of b and c are then kept secret by the participants.

B) Signature Generation
4) $e = H(m)$ Validate the hash of the message m
5) Broadcast $$\vartheta_i = D_{k(i)} \alpha_i + \beta_i \bmod n$$

And $$\omega_i = G \times \alpha_i$$

6) $\mu = $ Interpolate$(\vartheta_i, \ldots, \vartheta_n) \bmod n$
$\triangleright [[=D_k \alpha \bmod n]$ Where the operation $\mu = $ Interpolate $(\upsilon_1, \ldots, \upsilon_j) \bmod n$ is defined as the operation which recovers the secret from the shares.

7) $\theta = $ Exp-Interpolate $(\omega_1, \ldots, \omega_n)$
$\triangleright [=G \times \alpha]$ 8) Calculate $(R_x, R_y)$ where $r_{x,y} = (R_x, R_y) = \theta \times \mu^{-1}$
$\triangleright [=G \times D_k^{-1}]]$ 9) $r = r_x = R_x \bmod n$
If $r = 0$, start again (i.e. from the initial distribution)
10) Broadcast $S_i = D_{k(i)}(e + D_{A(i)} r) + C_i \bmod n$
11) $S = $ Interpolate$(s_i, \ldots, s_n) \bmod n$
If $s = 0$ redo Algorithm 3 from the start (A.1).
12) Return $(r, s)$
13) In Bitcoin, reconstruct the transaction with the $(r, s)$ pair to form a standard transaction.

REFERENCES

| Reference | Author, date, name & location |
| --- | --- |
| [Lightning 2016] | J Poon; T Dryja; *The Bitcoin Lightning Network: Scalable Off-Chain Instant Payments* (2016). |
| [Gennaro 1996] | R. Gennaro, S. Jarecki, H. Krawczyk, and T. Rabin. Robust threshold DSS signatures. *In International Conference on the Theory and Applications of Cryptographic Techniques*, 354-371 (1996). |
| [Goldfeder 2015] | S. Goldfeder, R. Gennaro, H. Kalodner, J. Bonneau, J. A. Kroll, E. W. Felten, and A. Narayanan. Securing Bitcoin wallets via a new DSA/ECDSA threshold signature scheme (2015). |
| [Gennaro 2016] | R. Gennaro et al.. *Threshold-optimal DSA/ECDSA signatures and an application to Bitcoin wallet security* (2016). International Conference on Applied Cryptography and Network Security. ACNS 2016: Applied Cryptography and Network Security pp 156-174. |
| [Boneh 2016] | Boneh, Dan, Rosario Gennaro, and Steven Goldfeder. "Using Level-1 Homomorphic Encryption To Improve Threshold DSA Signatures For Bitcoin Wallet Security." |
| [Wright 2016] | Wright, C. & Savanah, S. (2016) "Determining a common secret for two Blockchain nodes for the secure exchange of information" "International Patent Application Number: WO 2017/145010". 2016 |
| [Bogos 2016] | Bogos, Sonia, John Gaspoz, and Serge Vaudenay. "Cryptanalysis of a homomorphic encryption scheme." ArcticCrypt 2016. No. EPFL-CONF-220692. 2016. |
| [Yupu 2012] | Hu, Yupu, and Fenghe Wang. "An Attack on a Fully Homomorphic Encryption Scheme." IACR Cryptology ePrint Archive 2012 (2012): 561. |

The invention claimed is:

1. A method of transferring access to a digital asset, the method comprising:
    receiving a first blockchain transaction from a first participant by each of a plurality of second participants, wherein the first participant has a first private key of a first private-public key pair of a cryptography system, and each the participant has a respective share of a second private key of a second private-public key pair of the cryptography system, wherein the first blockchain transaction is signed with the first private key;
    verifying, by a plurality of the second participants, that the first blockchain transaction has been signed with the first private key;
    applying a respective the share of the second private key to the first blockchain transaction to generate a respective share of a first secret value, wherein the first secret value is a second blockchain transaction signed with the second private key, wherein the first secret value is accessible to a first threshold number of the shares of the first secret value and is inaccessible to less than the first threshold number of shares of the first secret value;
    combining at least the first threshold number of the shares of the first secret value from the first participant and a plurality of the second participants to generate the first secret value; and
    transferring access to the digital asset to a third private key of the cryptography system in the event of one or more of the plurality of second participants becoming unresponsive.

2. A method according to claim 1, wherein each of a plurality of the second participants has a respective private key of the cryptography system.

3. A method according to claim 1, further comprising distributing shares of the share of the second private key in possession of the first participant among the first participant and at least one second participant.

4. A method according to claim 1, wherein the digital asset remains under control of the third private key fora predetermined time.

5. A method according to claim 1, further comprising distributing the shares of the second private key among a plurality of the participants.

6. A method of transferring access to a digital asset, the method comprising:
    sending a first blockchain transaction from a first participant to a plurality of second participants, wherein the first participant has a first private key of a first private-public key pair of a cryptography system, and each the participant has a respective share of a second private key of a second private-public key pair of the cryptography system, wherein the first blockchain transaction is signed with the first private key;
    receiving, from a plurality of the second participants, a respective share of a first secret value, wherein the first secret value is a second blockchain transaction signed with the second private key, wherein the first secret value is accessible to a first threshold number of the shares of the first secret value and is inaccessible to less than the first threshold number of shares of the first secret value, wherein each the share of the second private key is applied to the second blockchain transaction after verification, by the corresponding the second participants, that the first blockchain transaction has been signed with the first private key;
    combining at least the first threshold number of the shares of the first secret value from the first participant and a plurality of the second participants to generate the first secret value; and
    transferring access to the digital asset to a third private key of the cryptography system in the event of one or more of the plurality of second participants becoming unresponsive.

7. A method according to claim 6, wherein each of a plurality of the second participants has a respective private key of the cryptography system.

8. A method according to claim 6, further comprising distributing shares of the share of the second private key in possession of the first participant among the first participant and at least one the second participant.

9. A method according to claim 6, wherein the digital asset remains under control of the third private key for a predetermined time.

10. A method according to claim 6, further comprising distributing the shares of the second private key among a plurality of the participants.

11. A method according to claim 1, wherein the cryptography system is an elliptic curve cryptography system, wherein the public key of each the public-private key pair is related to the corresponding private key by multiplication of an elliptic curve generator point by the private key.

12. A computer implemented system comprising:
    a processor; and
    nontransitory memory coupled with the processor and storing a set of instructions that, when executed by the processor, causes the processor to execute the method according to claim 1.

13. A method according to claim 6, wherein the cryptography system is an elliptic curve cryptography system, wherein the public key of each the public-private key pair is related to the corresponding private key by multiplication of an elliptic curve generator point by the private key.

14. A computer implemented system comprising:
    a processor; and
    nontransitory memory coupled with the processor and storing a set of instructions that, when executed by the processor, causes the processor to execute the method according to claim 6.

* * * * *